United States Patent
Williams et al.

(10) Patent No.: US 8,611,546 B2
(45) Date of Patent: Dec. 17, 2013

(54) METHOD AND APPARATUS FOR REMOTELY SWITCHING NOISE REDUCTION MODES IN A RADIO SYSTEM

(75) Inventors: William R. Williams, Coral Springs, FL (US); Blake C. Moselle, Plantation, FL (US); Matthew E. Simms, Davie, FL (US); Charles B. Swope, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 245 days.

(21) Appl. No.: 12/899,744

(22) Filed: Oct. 7, 2010

(65) Prior Publication Data
US 2012/0087514 A1    Apr. 12, 2012

(51) Int. Cl.
*H04R 5/00*  (2006.01)
*H04R 5/02*  (2006.01)

(52) U.S. Cl.
USPC ............... 381/17; 381/18; 381/300; 381/307; 381/1

(58) Field of Classification Search
USPC ............... 381/71.1, 94.1, 94.7; 704/226–228, 704/233; 455/253, 353, 404.1; 379/37, 45, 379/392.01
See application file for complete search history.

(56) References Cited

U.S. PATENT DOCUMENTS

| | | | |
|---|---|---|---|
| 5,982,901 A | 11/1999 | Kane et al. | |
| 7,103,176 B2* | 9/2006 | Rodriguez et al. | 379/392.01 |
| 8,140,116 B2* | 3/2012 | Yew et al. | 455/557 |
| 2008/0248774 A1 | 10/2008 | So et al. | |
| 2009/0034755 A1 | 2/2009 | Short et al. | |
| 2009/0060216 A1* | 3/2009 | Sweeney et al. | 381/71.2 |
| 2010/0130198 A1* | 5/2010 | Kannappan et al. | 455/434 |
| 2010/0135482 A1 | 6/2010 | Jagannathan et al. | |
| 2011/0096937 A1* | 4/2011 | Zhang et al. | 381/71.11 |

OTHER PUBLICATIONS

International Search Report and Written Opinion dated Feb. 28, 2012 in related case PCT/US2011/053341.

* cited by examiner

*Primary Examiner* — Duc Nguyen
*Assistant Examiner* — Anita Masson

(57) ABSTRACT

A radio configured to dynamically control cancellation of undesired signals in an audio stream. The radio includes a noise cancellation processor configured to receive an audio stream from a user and to alter information in the audio stream by filtering out undesired signals in the audio stream. The radio also includes a receiving component configured to receive a data packet from a remote device, to retrieve configuration information from the data packet, and to dynamically apply the configuration information, while the radio is being used by a user, to settings associated with the noise cancellation processor. A dynamically enabled noise cancellation processor suppresses undesired signals associated with a subsequent incoming audio stream provided by the user and transmits at least one of an altered audio stream or an unaltered audio stream to the remote device.

20 Claims, 4 Drawing Sheets

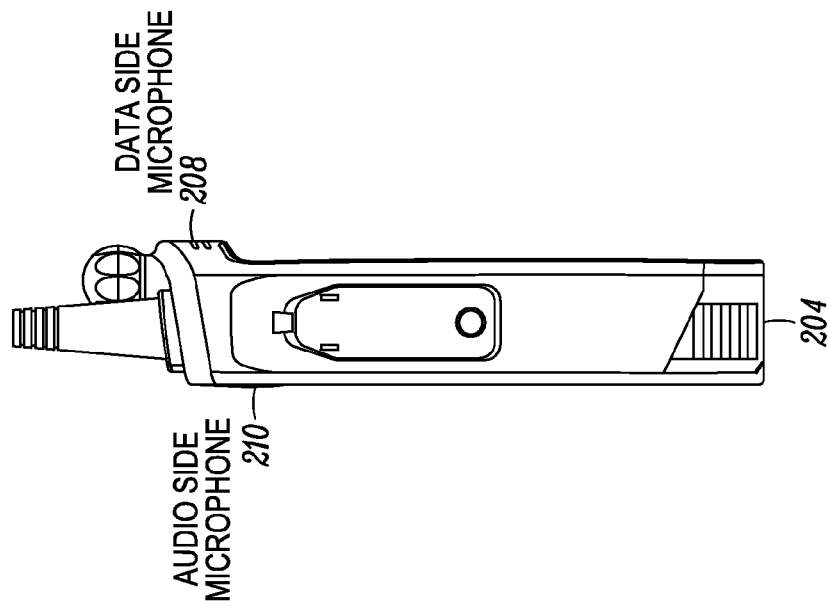
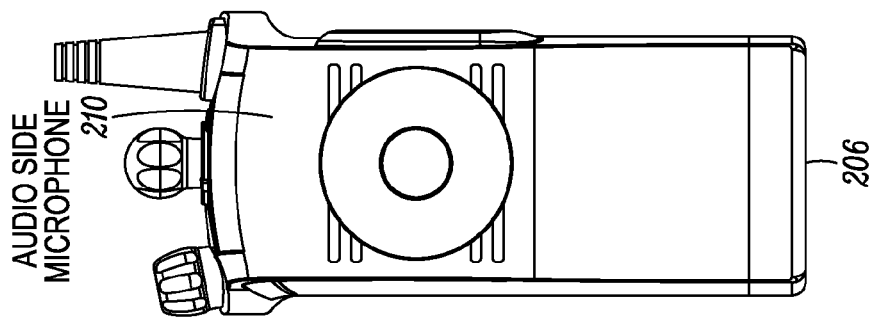
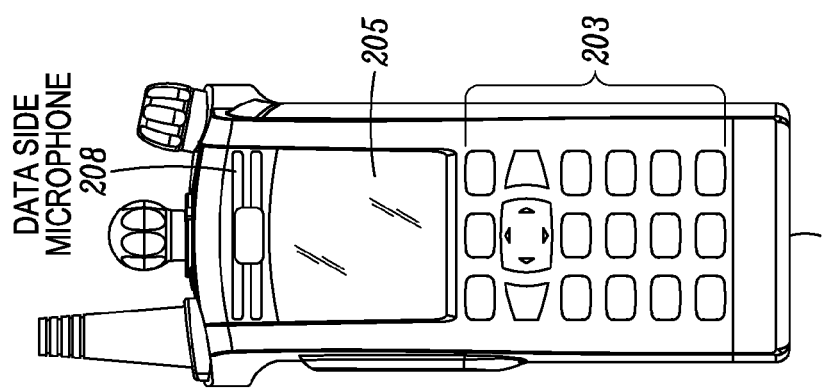

METHOD AND APPARATUS FOR REMOTELY SWITCHING NOISE REDUCTION MODES IN A RADIO SYSTEM

FIELD OF THE DISCLOSURE

The present disclosure relates generally to noise cancellation in a radio and more particularly to remotely and dynamically configuring a noise cancellation processor in the radio.

BACKGROUND

A radio, such as a portable two-way radio, enables communications by sending and receiving information through transmit/receive antenna(s). The radio typically includes a noise cancellation processor to improve the quality of audio transmitted from the radio. One type of noise cancellation processor is a statically enabled or disabled digital signal processor which executes a Dual Input Noise Cancellation (DINC) algorithm and which is configured to suppress transmission of background noise in an associated audio stream. In particular, the noise cancellation processor is optimized to remove ambient noises such as wind or constant background audio activity like crowd noise, automobile noise or other low frequency sounds that are repetitive in nature. Therefore, when enabled, the DINC processor enhances a desired signal, such as a user's voice, by suppressing background noise in the associated audio stream.

While spoken information is transmitted more clearly when the noise cancellation processor is enabled, unspoken information normally conveyed in background noise is suppressed and is not readily communicated. The suppressed information may sometimes be valuable, or in some cases critical, information. For example, in a public radio dispatch system, remote personnel use radios to communicate with dispatchers at a centralized dispatch center. A dispatcher typically uses background information transmitted from the radios to assess environmental conditions at remote locations. As noted above, the enabled noise cancellation processor eliminates or greatly reduces the transmission of background information to the dispatcher. In one example, the enabled noise cancellation processor may eliminate traffic noise that may indicate to the dispatcher that the remote personnel are near a busy road. In another example, the enabled noise cancellation processor may eliminate sounds associated with a physical or verbal alteration, and therefore, information transmitted from the radio may fail to indicate a potentially volatile situation. This causes dispatchers to rely primarily on the spoken information provided by radio users in assessing the environmental conditions at remote locations.

In some situations, the remote personnel may not have sufficient time to convey the severity of a situation to the dispatcher. The remote personnel also may not have sufficient time to disable, or may not be able to disable, the statically enabled noise cancellation processor. As such, there is a need to enhance non-verbal communications from users of radios, without eliminating the benefits provided by the noise cancellation processor.

Accordingly, there is a need to remotely and dynamically control and configure the noise cancellation processor in the radio while the radio is being used in communication.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2A illustrates a perspective front view of a radio used in accordance with some embodiments.

FIG. 2B illustrates a perspective rear view of a radio used in accordance with some embodiments.

FIG. 2C illustrates a perspective side view of a radio used in accordance with some embodiments.

Figure 1:
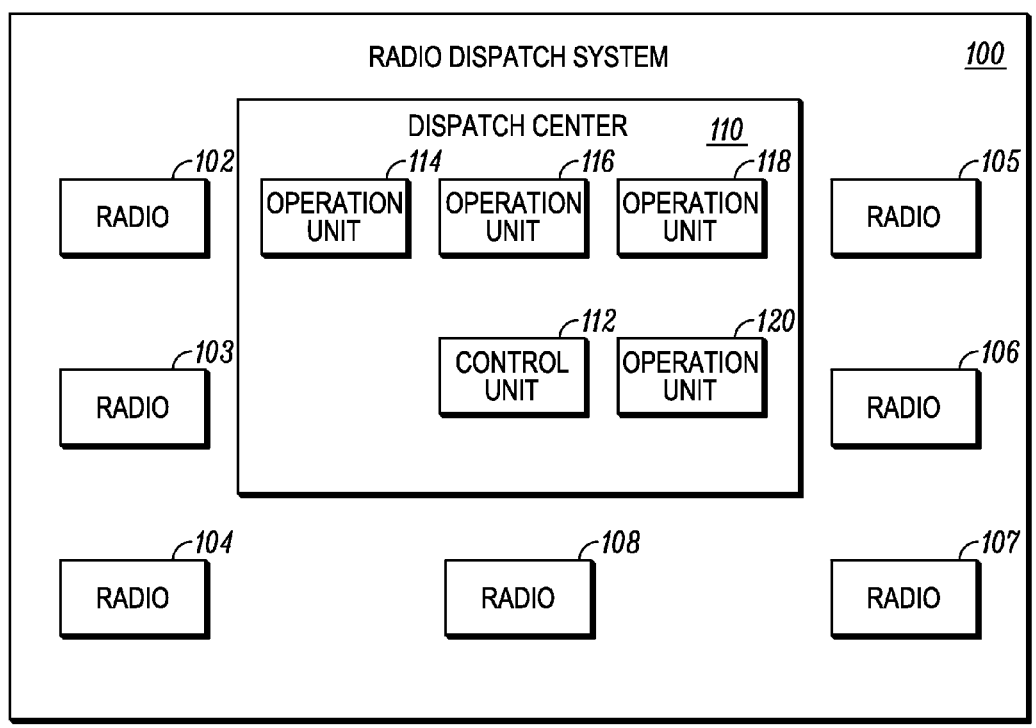
FIG. 1 illustrates a block diagram of a radio dispatch system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to a radio configured to dynamically control cancellation of undesired signals in an audio stream. The radio includes a noise cancellation processor configured to alter information in an audio stream by filtering out undesired signals in the audio stream. The radio also includes a receiving component configured to receive a data packet including audio information and configuration information from a remote device. The receiving component is also configured to retrieve the configuration information from the data packet, and to dynamically apply the configuration information, while the radio is being used by a user, to settings associated with the noise cancellation processor to enable, disable or otherwise configure the settings. When dynamically enabled, the noise cancellation processor is configured to suppress undesired signals associated with a subsequent incoming audio stream and to transmit at least one of an altered audio stream or an unaltered audio stream for further transmission to the remote device.

FIG. 1 illustrates a radio dispatch system used in accordance with some embodiments. Radio dispatch system 100 includes one or more remote radios 102-108 and a centralized dispatch center 110. Radios 102-108 may be, for example, portable two-way radios, mobile radios, or other similar radios which are geographically located outside the proximate location of centralized dispatch center 110. Radios 102-108 are used by remote personnel to communicate with one or more dispatchers in centralized dispatch center 110. Radio dispatch center 110 typically includes a control unit 112 and one or more console operation units 114-120. Control unit 112 is a central switch that routes audio information between remote radios 102-108 and console operation units 114-120. Each console operation unit 114-120 is used by a dispatcher to receive, monitor, and transmit audio information transmitted to one or more of remote radios 102-108. Although the discussion below is directed to a two way conversation between a single sender/remote personnel and a receiver/dispatcher at the dispatch center, some embodiments may be directed to multi-users communications, wherein more than one remote personnel participate in a group communication session with dispatchers or with each other.

FIG. 2A illustrates a perspective front view 202 of a radio, FIG. 2B illustrates a perspective rear view 206 of the radio, and FIG. 2C illustrates a perspective side view 204 of the radio used in accordance with some embodiments. Specifically, each of FIGS. 2A-2C illustrates views of a portable two-way radio. It should be appreciated that although a portable two-way radio is shown, any wireless radio could incorporate the described embodiments. The front view 202 of the radio shows a microphone 208 for receiving audio input, input keys 203 for entering or selecting data, and a display screen 205 for displaying information to a user. The rear view 206 of the radio shows another microphone 210 for receiving audio input from the user. The side view 204 of the radio shows the relative physical positions of both microphones 208 and 210, incorporated in the front and rear of the radio, for improved audio quality. Other known components and features of the radio are not shown for the sake of simplicity.

Figure 3:
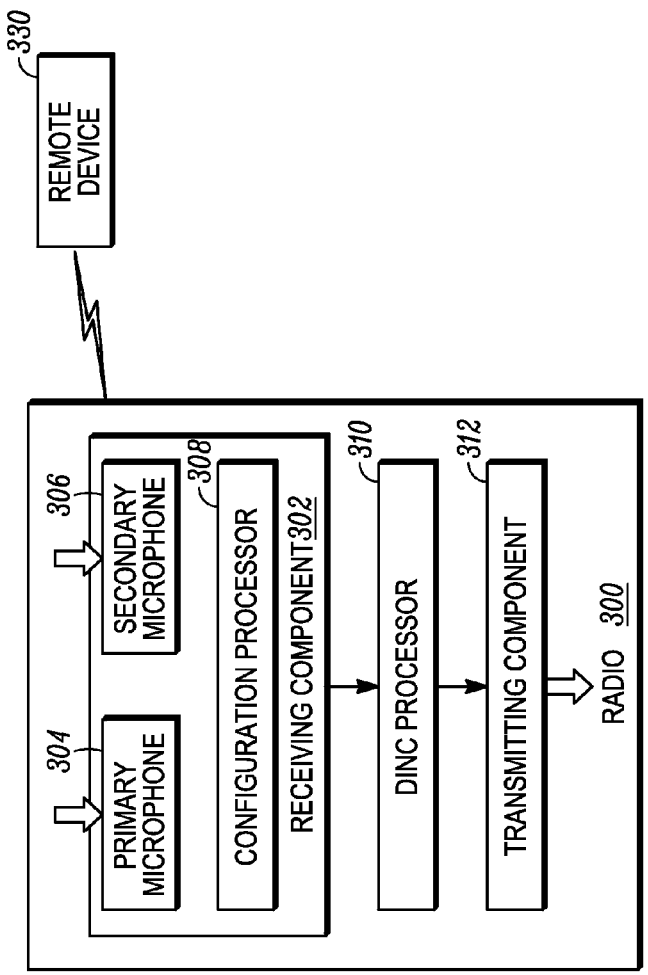
FIG. 3 is a block diagram of components incorporated in a radio in accordance with some embodiments.

FIG. 3 is a block diagram of components incorporated in a radio 300 in accordance with some embodiments. Radio 300 includes a receiving component 302, a Dual Input Noise Cancellation (DINC) processor 310, and a transmitting component 312. The receiving component 302 is configured to receive data packets with information, such as audio signals and/or configuration information, from a remote device 330, such as the dispatch center or another radio. Remote device 330 is a communications device which is geographically located outside the proximate location of radio 300. The receiving component 302 is configured to receive audio signals when a user of radio 300 speaks into one or both microphones 208 and 210 (shown in FIGS. 2A-2C). The audio signals inputted by the user are processed by one or more components in the radio and transmitted to the remote device 330. Components in radio 300 include, for example, processors configured to implement specific functions in radio 300. Configuration information received from remote device 330 is used to dynamically control configuration settings associated with one or more components in radio 300 while radio 300 is being used in communications with remote device 330. Thereafter, subsequent audio signals inputted by the user are processed according to the changed settings in the associated radio components.

An enabled DINC processor 310 is configured to alter audio signals in an audio stream inputted by the user by suppressing undesired signals, such as background noise, in the audio stream. Transmitting component 312 is configured to further process the audio signals inputted by the user and output/transmit the processed audio stream to remote device 330. In some embodiments, transmitting component 312 may further process the audio signals prior to transmission to influence gain and/or loudness in the transmitted audio stream. It should be apparent to one skilled in the art that other known components of radio 300 are not shown in FIG. 3 for the sake of simplicity.

The receiving component 302 includes a primary microphone 304 and a secondary microphone 306. Each of microphones 304 and 306 is configured to receive audio signals from the user. The receiving component 302 also includes a configuration processor 308 for dynamically configuring settings associated with radio components, such as DINC processor 310, based on the configuration information received from remote device 330. In particular, based on the configuration information, components in radio 300 can be dynamically configured during communications between users of remote device 330 and radio 300. For example, configuration processor 308 may dynamically enable, disable, or modify other configuration settings used by DINC processor 310 based on configuration information received from remote device 330 while the user of radio 300 is using the radio to communicate with the user of remote device 330. In some embodiments, depending on the received configuration information, configuration processor 308 may dynamically change the DINC processor's noise cancellation settings to, for example, active, standby, or off and may dynamically turn on or off an audio band noise filter that is configured to dynamically filter out undesired signals or noise.

Configuration processor 308 may also dynamically configure the settings of other components in radio 300, based on the configuration information received from remote device 330. For example, configuration processor 308 may dynamically select a beam source or configure settings associated with beam forming activities. In current systems, the enabled DINC processor forms a beam pattern based on the radio user's position, to maximize audio input provided by the user. The enabled DINC processor also forms at least one appropriate null pattern to minimize background environmental noise. The position of at least one null in the pattern can be changed dynamically as the background noise changes relative to the position of the user. This causes the user's voice to be heard more clearly, with minimum background noise. In some embodiments, configuration processor 308 may configure beam forming settings to, for example, active, active with freeze coefficient weightings, or inactive. In selecting the beam source, configuration processor 308 may also dynamically set an automatic beam selection to choose, for example, a first beam or a second beam. The beam configuration set by configuration processor 308 enables other processors in radio 300 to obtain status information associated with beam forming activities. For example, based on the beam configuration, other processors in radio 300 can determine whether a beam is accentuated and they can determine the incoming direction of the audio signal inputted by the user.

Configuration processor 308 may also dynamically set microphone configurations, spatial equalization vectors for front and back microphones 208 and 210 (as shown in FIGS. 2A-2C), or the microphone summation to a first microphone or a second microphone, depending on the configuration information received from remote device 330. The microphone configurations set by configuration processor 308 enable other processors in radio 300 to determine if one or more microphones are processing information. Configuration processor 308 may further dynamically configure the number of audio sub-bands treated, coefficients for audio sub-bands, and noise adaptation rate coefficients.

When a packet including audio and configuration information is received at radio 300, configuration processor 308 retrieves the configuration information and uses it to dynamically configure settings associated with the appropriate radio components during conversation between the users of remote device 330 and radio 300. Upon configuring a radio component's settings, all subsequent audio signals inputted into radio 300 by the user are processed according to the updated configuration settings. For example, if an incoming packet received by radio 300 includes configuration information for enabling DINC processor 310, configuration processor 308 retrieves this information and dynamically configures the appropriate settings associated with enabling DINC processor 310 while the user of radio 300 is communicating with the user of remote device 330. Thereafter, audio information inputted by the user of radio 300 is transmitted from receiving component 302 to DINC processor 310 for further processing. In particular, the DINC processor 310 processes the inputted audio stream by suppressing undesired signals, such as background noise, in the audio stream. In some embodiments, DINC processor 310 suppresses noise in a copy of the audio stream and transmits only the altered copy of the audio stream to transmitting component 312 for further processing and transmission to remote device 330. In other embodiments, DINC processor 310 may transmit both the altered copy of the audio stream and the unaltered audio stream to transmitting component 312 for further processing and transmission to remote device 330. In other embodiments, DINC processor 310 alters the original audio stream and transmits the altered audio stream to transmitting component 312 for further processing and transmission to remote device 330.

In another example, if the incoming packet received by radio 300 includes configuration information for disabling DINC processor 310, configuration processor 308 retrieves this information and dynamically configures, during communications between the users of remote device 330 and radio 300, the settings that are associated with disabling DINC processor 310. Thereafter, in some embodiments, although the audio signals inputted by the user are transmitted from receiving component 302 to DINC processor 310, DINC processor 310 does not perform noise suppression on the inputted audio signals. DINC processor 310 transmits the unaltered audio stream to transmitting component 312 for further processing and transmission to remote device 330. In some embodiments, when the settings associated with disabling DINC processor 310 are configured, DINC processor 310 is by-passed and subsequent audio signals inputted by the user are sent directly from receiving component 302 to transmitting component 312 for further processing and transmission to remote device 330. When radio 300 disables the DINC processor, it reverts to an omni-microphone response state.

Some embodiments may implement any packet-based protocol, such as Time Division Multiple Access (TDMA) protocol or Frequency Division Multiple Access (FDMA) protocol. As is known to those of ordinary skill in the art, data packets typically include one or more reserved fields. One or more bytes of the reserved fields may be used as configuration fields to transmit configuration information from remote device 330. In particular, one or more configuration fields can be used to transmit configuration information for dynamically changing settings associated with components in radio 300. For example, to disable or enable noise cancellation, a configuration field can be set to a value that is predefined and associated with switching an audio beam forming mode off or on. When the data packet with the configuration field for DINC processor 310 is received by radio 300, configuration processor 308 uses the value in this field to dynamically configure the appropriate settings that are associated with disabling or enabling DINC processor 310. Data packets including the configuration fields may also include other control fields and fields with audio information.

Figure 4:
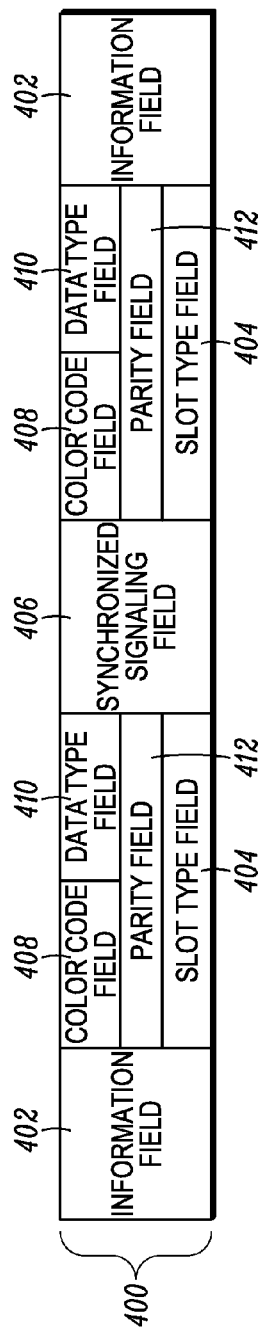
FIG. 4 is a block diagram of a data packet received by a radio in accordance with some embodiments.

FIG. 4 is a block diagram of a data packet 400 transmitted to a radio in accordance with some embodiments. Data packet 400 shown in FIG. 4 is an example of a data packet that may be used in some embodiments. The fields in data packet 400 are also examples of fields that may be used in some embodiments and are not specific requirements for a specific protocol. Each protocol will have a different design with different field types that may be used in some embodiments. Usually, there exists some type of configuration field that is used for transmitting the configuration information. Data packet 400 includes an information field 402, a slot type field 404, and a synchronized signaling field 406. Information field 402 includes data and control payload. Slot type field 404 includes embedded signaling that defines the information field 402. Slot type field 404 is further divided into a color code field 408, a data type field 410 and a parity field 412. Color code field 408 is used to differentiate signaling origination, that is, to differentiate signaling that originates at different sites. Data type field 410 indicates the type of control information or data being transmitted. In an embodiment, at least one byte in data type field 410 includes configuration information for the DINC processor and/or other radio components. In another embodiment, the configuration information could be included in information field 402. Parity fields 412 are used to transmit Forward Error Correction (FEC) parity data associated with error detection redundancy. Embedded signaling field 406 is a 48 bit synchronization word for synchronizing transmission of data packets.

As previously noted, when data packet 400 is received by the radio, if data type field 410 is configured to enable the DINC processor, the configuration processor dynamically configures the appropriate settings that are associated with enabling the DINC processor. The DINC processor thereafter alters incoming audio signals provided by the user by suppressing background noise, in either a copy of the inputted audio stream or in the audio stream itself. The radio transmits either the altered audio stream or both an altered copy of the audio stream and the unaltered audio stream to the remote device. Using, for example the TDMA protocol, the radio can transmit the altered audio stream in a primary time slot and the unaltered audio stream in a secondary slot during a single transmission. In an embodiment, when there is no need for the unaltered audio stream, the secondary slot may be used for other voice traffic. Upon receipt of the altered and unaltered audio streams, the receiver at the remote device can select to listen to the altered audio stream, the unaltered audio stream, or switch between listening to the altered and unaltered audio streams. At the dispatch center, the dispatcher can select audio streams by using input keys on the console operation unit. In embodiments where the information is transmitted from one radio to another radio, the user at the other radio may use one or more input keys on the other radio to select the altered audio stream, the unaltered audio stream, or switch between listening to the altered and unaltered audio streams.

In some embodiments, the remote device may transmit the configuration information when the radio is in a non-audio transmitting state, that is, when the radio is idle and is not transmitting information. This capability is allowed based on the protocol being used. For instance, if the radio can receive and transmit at the same time or if it is using the TDMA protocol, the radio is capable of receiving configuration commands while the user is speaking. If, on the other hand, the radio is using a FDMA analog protocol, for instance, it may not be able to receive the configuration command unless it is in the non-audio transmitting state. When the radio receives configuration information while it is in the non-audio transmitting state, the configuration processor retrieves the configuration information and configures the appropriate settings for associated radio components. If the received configuration information is associated with enabling the DINC processor, the enabled DINC processor processes subsequent incoming audio signals provided by the user by suppressing undesired signals such as background noise in the audio data. Altered audio streams are then transmitted from the radio until it receives different configuration information when it re-enters the non-audio transmitting state.

Configuration information in the data type field 410 can be provided by selecting one or more predefined switches on the console operation unit at the dispatch center. Information associated with the predefined switches may then be included with audio information in a data packet 400 and transmitted from the dispatch center. Configuration information in the data type field 410 can also be provided by, for example, inputting predefined information into another radio through one or more input keys on the other radio. The configuration information is included with audio information in a data packet 400 and transmitted from the other radio. In some embodiments, regardless of the source of the configuration information, upon receipt of the configuration information, the settings for components in the radio are modified. In other embodiments, the radio may be configured to accept information from predefined sources. For example, the radio may be configured to accept configuration information from only the dispatch center and not from other radios.

Figure 5:
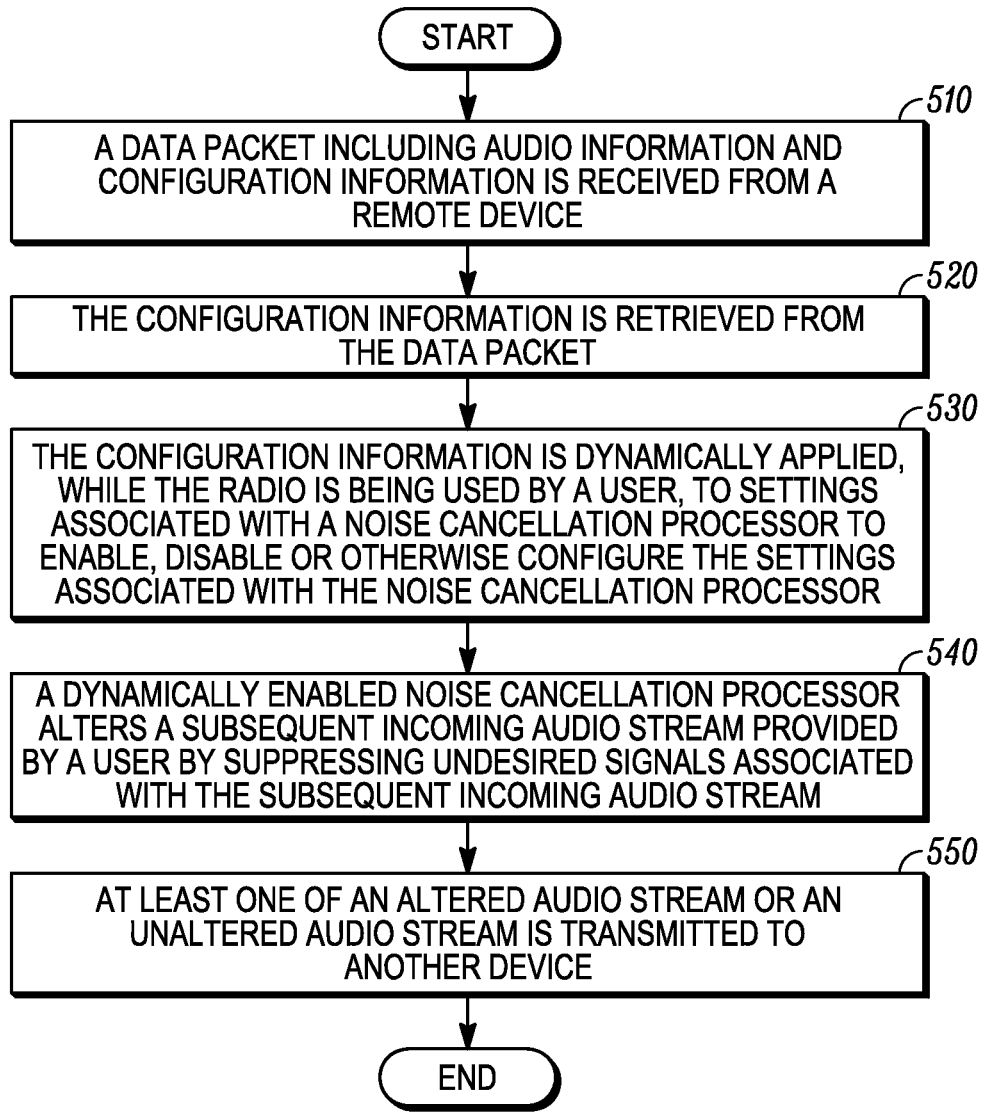
FIG. 5 is a flowchart of a method of dynamically controlling cancellation of undesired signals in an audio stream in accordance with some embodiments.

FIG. 5 is a flowchart of a method of dynamically controlling cancellation of undesired signals in an audio stream in accordance with some embodiments. In 510, a data packet including audio information and configuration information is received from a remote device. In 520, the configuration information is retrieved from the data packet. In 530, the configuration information is dynamically applied, while the radio is being used by a user, to settings associated with a noise cancellation processor to enable, disable or otherwise configure the settings associated with the noise cancellation processor. In 540, a dynamically enabled the noise cancellation processor alters a subsequent incoming audio stream provided by a user by suppressing undesired signals associated with the subsequent incoming audio stream. In 550, at least one of an altered audio stream or an unaltered audio stream is transmitted for further transmission to the remote device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio configured to dynamically control cancellation of undesired signals in an audio stream, comprising:
a noise cancellation processor configured to alter information in an audio stream by filtering out undesired signals in the audio stream; and
a receiving component including at least one microphone configured to provide audio signals to the noise cancellation processor, the receiving component also configured to receive a data packet from a remote device including noise cancellation configuration information selected by a user of the remote device, to retrieve the noise cancellation configuration information from the data packet, and to dynamically apply the noise cancellation configuration information, while the radio is being used by a user, to noise cancellation settings associated with the noise cancellation processor to enable, disable or otherwise configure the noise cancellation settings such that the selection by the remote user can switch between listening to altered or unaltered audio streams from the radio,
wherein when dynamically enabled by the remote user of the remote device, the noise cancellation processor is configured to suppress undesired signals associated with a subsequent incoming audio stream and to transmit the altered audio stream to the remote device, and
wherein when dynamically disabled by the remote user of the remote device, the noise cancellation processor is configured to pass a subsequent incoming audio stream unaltered and to transmit the unaltered audio stream to the remote device, and
wherein when dynamically enabled by the remote user of the remote device, the noise cancellation processor is configured to modify undesired signals associated with a subsequent incoming audio stream and to transmit a modified audio stream to the remote device.

2. The radio of claim 1, wherein the receiving component comprises a noise cancellation configuration component configured to retrieve the noise cancellation configuration information from the data packet and to dynamically apply the noise cancellation configuration information to noise cancellation settings associated with at least one other radio component while the radio is being used in communications.

3. The radio of claim 2, wherein the noise cancellation configuration component is further configured to dynamically control noise cancellation configuration settings associated with the noise cancellation processor and an audio noise filter.

4. The radio of claim 2, wherein the receiving component is configured to bypass the noise cancellation processor when the noise cancellation configuration component dynamically configures noise cancellation settings associated with disabling the noise cancellation processor while the radio is being used by the user, wherein the remote device will provide noise cancellation of the incoming unaltered audio stream.

5. The radio of claim 1, wherein the receiving component includes at least two microphones, and wherein the noise cancellation processor is also configured to provide beam forming for the at least two microphones, wherein the beam forming is controlled by the noise cancellation configuration information from the data packet from the remote device, and wherein when noise cancellation is disabled the microphones revert to an omni-directional state.

6. The radio of claim 1, further comprising a transmitting component configured to process at least one of the altered audio stream or the unaltered audio stream from the noise cancelling processor as selected by the remote user and to transmit the processed stream to the remote device.

7. The radio of claim 1, wherein the noise cancellation processor is configured, when enabled, to create the altered audio stream by processing a copy of the subsequent incoming audio stream.

8. The radio of claim 1, wherein the data packet includes a noise cancellation configuration field that is set to a predefined noise cancellation configuration that is associated with controlling the noise cancellation processor.

9. The radio of claim 1, wherein the radio is configured to transmit the altered audio stream in a first time slot and the unaltered audio stream in a second time slot for the remote device to be able to switch between listening to altered or unaltered audio streams from the radio.

10. The radio of claim 1, wherein the radio is configured to receive noise cancellation configuration information in the data packet when the radio is in an idle, non-audio transmitting state.

11. The radio of claim 10, wherein the noise cancellation processor is configured to suppress undesired signals associated with the subsequent incoming audio stream and to transmit at least one of the altered audio stream or the unaltered audio stream to the remote device until different noise cancellation configuration information is received when the radio re-enters the non-audio transmitting state.

12. A method for dynamically controlling cancellation of undesired signals in an audio stream, comprising:
receiving, in a radio, a data packet including noise cancellation configuration information from a remote device wherein the noise cancellation configuration information is selected by a user of a remote device;
retrieving the noise cancellation configuration information from the data packet by the radio;
dynamically applying the noise cancellation configuration information, while the radio is being used by a user, to noise cancellation settings associated with a noise cancellation processor to enable, disable or otherwise configure the noise cancellation settings such that the selection by the remote user can switch between listening to altered or unaltered audio streams from the radio;
altering a subsequent audio stream in the noise cancellation processor dynamically enabled by the remote user of the remote device, by suppressing or modifying undesired signals in the subsequent incoming audio stream, or
passing a subsequent audio stream unaltered through the noise cancellation processor dynamically disabled by the remote user of the remote device; and
transmitting, by the radio, at least one of the altered audio stream or the unaltered audio stream to the remote device.

13. The method of claim 12, further comprising dynamically applying the noise cancellation configuration information to noise cancellation settings associated with at least one other radio component while the radio is being used.

14. The method of claim 12, further comprising dynamically controlling noise cancellation configuration settings associated with the noise cancellation processor and an audio noise filter.

15. The method of claim 12, further comprising bypassing the noise cancellation processor when the noise cancellation configuration settings associated with the noise cancellation processor are disabled while the radio is being used, wherein the remote device will provide noise cancellation of the incoming unaltered audio stream.

16. The method of claim 12, further comprising altering, by the dynamically enabled noise cancellation processor, the subsequent incoming audio stream by processing a copy of the subsequent incoming audio stream.

17. The method of claim 12, further comprising transmitting the altered audio stream in a first time slot and the unaltered audio stream in a second time slot, and switching between listening to the altered and unaltered audio streams at the remote device.

18. The method of claim 12, further comprising receiving the noise cancellation configuration information in the data packet when the radio is in an idle, non-audio transmitting state.

19. The method of claim 18, further comprising suppressing undesired signals associated with the subsequent incoming audio stream and transmitting at least one of the altered audio stream or the unaltered audio stream to the remote device until different noise cancellation configuration information is received when the radio re-enters the non-audio transmitting state.

20. The method of claim 12, further comprising receiving a noise cancellation configuration field in the data packet, wherein the noise cancellation configuration field is set to a predefined noise cancellation configuration that is associated with controlling the noise cancellation processor.

\* \* \* \* \*